United States Patent
Komiya et al.

(10) Patent No.: US 6,528,553 B1
(45) Date of Patent: Mar. 4, 2003

(54) RADIATION CURABLE RESIN COMPOSITION

(75) Inventors: Zen Komiya, Tsukuba (JP); Adrianus G. M. Abel, Capelle aan de Ijssel (NL); Duurt P. W. Alkema, Den Haag (NL); Masahito Mase, Tsukuba (JP); Takashi Ukachi, Ushiku (JP)

(73) Assignees: DSM N.V., Heerlen (NL); JSR Corporation, Tokyo (JP)

( * ) Notice: Subject to any disclaimer, the term of this patent is extended or adjusted under 35 U.S.C. 154(b) by 0 days.

(21) Appl. No.: 09/620,367

(22) Filed: Jul. 20, 2000

Related U.S. Application Data
(60) Provisional application No. 60/145,294, filed on Jul. 23, 1999.

(30) Foreign Application Priority Data

Jul. 20, 1999  (EP) .............................................. 99202374

(51) Int. Cl.$^7$ ................................................. C08F 2/48
(52) U.S. Cl. ............................. 522/96; 522/90; 522/97; 522/182; 522/120; 522/121; 522/28; 522/173; 522/174; 428/378; 428/380; 428/388; 428/426; 428/441
(58) Field of Search .......................... 522/96, 97, 90, 522/182, 120, 121, 28, 173, 174; 428/378, 380, 388, 426, 441

(56) References Cited

U.S. PATENT DOCUMENTS

| | | | |
|---|---|---|---|
| 5,352,712 A | 10/1994 | Shustack | |
| 5,698,746 A | 12/1997 | Lambert | |

FOREIGN PATENT DOCUMENTS

| | | |
|---|---|---|
| EP | 0874012 | 10/1998 |
| WO | WO98/41484 | 9/1998 |

*Primary Examiner*—James J. Seidleck
*Assistant Examiner*—Sanza L. McClendon
(74) *Attorney, Agent, or Firm*—Pillsbury Winthrop LLP

(57) ABSTRACT

The present invention provides a curable composition, comprising: a (meth)acrylate urethane compound derived from a polypropylene glycol or a propyleneoxide ethyleneoxide copolymer glycol having a molecular weight between 1,000 and 13,000 and an amount of unsaturation less than 0.01 meq/g. The liquid curable resin composition of the present invention has improved liquid stability and can produce cured products having superior mechanical characteristics by polymerization. The composition further comprises preferably a primary or secondary amine. The liquid curable resin composition can be used as a coating material for optical fibers, adhesives, and the like. The composition is particularly suitable as a coating material for optical fibers for which long-term stability is required.

25 Claims, No Drawings

RADIATION CURABLE RESIN COMPOSITION

CROSS REFERENCE TO RELATED APPLICATIONS

This Application claims the benefit of Provisional Application 60/145,294 which was filed on Jul. 23, 1999.

FIELD OF THE INVENTION

The present invention relates to a curable composition having high speed curing and capable of producing cured products by polymerization without impairing mechanical properties. In particular, the curable composition of the present invention is a liquid curable composition that can be formulated for use in a wide variety of applications including, for example, coatings and/or binders. In particular, these curable compositions offer relatively fast cure speeds that offer advantages in many application such as in the production of fiber optics wherein production speeds make it desirable to utilize primary coatings, secondary coatings (including, for example transparent and/or colored secondary coatings), inks, matrix materials and/or bundling materials that can be cured rapidly.

BACKGROUND OF THE INVENTION

In the production of optical fibers, a resin coating is applied immediately after spinning molten glass fibers for protection and reinforcement. A known structure of the resin coating has been a double-layered coating structure consisting of a primary coating layer of a flexible resin which is coated on the surface of optical fibers and a secondary coating layer of a rigid resin which is provided over the primary coating layer. A so-called optical fiber ribbon has been known in the art in the application of optical fibers provided with such a resin coating. The optical fiber ribbon is made from several optical fibers, e.g., four or eight optical fibers, arranged on a plane and secured with a binder to produce a ribbon structure having a rectangular cross section. A resin composition for forming the primary coating layer is called a soft coating, a resin composition for forming the secondary coating layer is called a hard coating, and a material for binding several optical fibers to produce the optical fiber ribbon structure is called a ribbon matrix material. Often, the fibers for identification purposes will be further coated with an ink, which is a curable resin comprising a colorant (such as a pigment and/or a dye), or the secondary coating may be a colored secondary coating (i.e, comprise a colorant). In addition, a material for the further binding of several optical fiber ribbons to produce multi-core optical fiber ribbons is called a bundling material.

Characteristics required for curable resins used as coating materials for optical fibers include: being a liquid at room temperature and having a sufficiently low viscosity for excellent coating; exhibiting superior storage stability and no compositional distribution as a liquid; providing good productivity owing to a high cure speed; having sufficient strength and superior flexibility after curing; exhibiting very little physical change during wide range temperature changes, in particular primary coatings should have very low Tg; having superior heat resistance and superior resistance to hydrolysis; showing superior long term reliability due to little physical change over time; showing superior resistance to chemicals such as acids and alkalis; absorbing only a small amount of moisture and water; exhibiting superior light resistance; exhibiting high oil resistance; producing little hydrogen gas which adversely affects optical fibers; and the like.

In the production of optical fibers and optical fiber assemblies, one of the limitations on how fast the production line can be operated is the cure speed of the coatings and/or binder. Accordingly, it is desirable to develop coatings and/or binders with faster cure speed.

The resin composition for coating optical fibers must remain a liquid during production of the coating, and after being stored for a long period of time. If the resin composition solidifies entirely or partially during storage by (e.g.) flocculation or crystallization, the composition must be heated to avoid any problems in the coating process of the optical fibers, thereby impairing handling of the resin composition.

An object of the present invention is to provide a liquid curable resin composition which exhibits a faster cure speed and better aging characteristics, for example, lower yellowing of the cured composition. A further object of the present invention is to provide coatings having a low Tg (glass transition-temperature).

SUMMARY OF THE INVENTION

The present invention provides a curable composition, comprising: a (meth)acrylate urethane compound derived from a polypropylene glycol or a copolymer comprising propyleneoxide and ethyleneoxide (herein after also just named polypropyleneglycol) having a molecular weight between 1,000 and 13,000 and an amount of unsaturation less than 0.01 meq/g, and/or mixtures of (meth)acrylate urethane compounds derived from such a polypropylene glycol and other polyols. The liquid curable resin composition of the present invention has improved liquid stability, and improved cure speed; the cured products have superior mechanical characteristics. The liquid curable resin composition can be used as a coating material for optical fibers, adhesives, and the like. The composition is particularly suitable as a coating material for optical fibers for which long-term stability is required. Also, the composition can be formulated to achieve low Tg, e.g. between −70° C. and −30° C.

In particular, the compositions of the present invention offer relatively fast cure speeds which offer advantages in many applications, including the production of fiber optics wherein production speeds make it desirable to utilize primary coatings, secondary coatings (including, for example transparent and/or colored secondary coatings), inks, matrix materials and/or bundling materials that can be cured rapidly.

Furthermore, the present invention provides a method for forming the curable composition of the present invention comprising a process for forming the urethane compound by reacting (a.1) a polypropylene glycol or a polypropylene/ethylene glycol copolymer having a molecular weight between 1,000 and 13,000 and an amount of unsaturation less than 0.01 meq/g, and (a.2) optionally, a further polyol or mixture of polyols;

(b) a polyisocyanate, and (c) a (meth)acrylate containing a hydroxyl group, wherein the process includes (i) reacting said glycol (a.1 and if applicable a.2), the polyisocyanate, and the hydroxyl group-containing (meth)acrylate altogether; (ii) reacting said glycol and the polyisocyanate, and reacting the resulting product with the hydroxyl group-containing (meth)acrylate; (iii) reacting the polyisocyanate and the hydroxyl group-containing (meth)acrylate, and reacting the resulting product with said glycol; or (iv) reacting the polyisocyanate and the hydroxyl group-containing (meth) acrylate, reacting the resulting product with said glycol, and reacting the hydroxyl group-containing (meth) acrylate once more.

In a further aspect of the invention, a radiation curable resin is provided, for a primary coating of an optical fiber comprising (a) 40–95 wt % of polyurethane having a polyoxyalkylene structure, in which the weight ratio of propylene oxide and ethylene oxide is 100:0 to 80:20, and an ethylenically unsaturated group, (b) 3–50 wt % of monofunctional (meth)acrylate of which the homopolymer has a glass transition temperature of 20° C. or less, and (c) 0.01–5 wt % of primary or secondary amine compound, wherein wt % is based on the total amount of the components (a), (b), and (c).

A DETAILED DESCRIPTION OF PREFERRED EMBODIMENTS OF THE INVENTION (Meth)acrylic—as used herein is understood to represent separately and collectively acrylic, methacrylic and mixtures thereof. Similarly, (meth)acrylate as used herein is understood to represent separately and collectively acrylate, (meth)acrylate, and mixtures thereof.

Polypropylene glycol or polypropylene/ethylene copolymer glycol (having a specified molecular weight and a specified amount of unsaturation)—as used herein is understood to refer to a polypropylene glycol comprising composition having a plurality of polypropylene glycol moieties and optionally ethylene glycol moieties that on average have the stated molecular weight and the stated unsaturation (referred to the meq/g unsaturation for the total composition, which is typically less than 0.01 meq/g).

The curable resin of the present invention comprises a urethane compound having at least one (meth)acrylate group derived from a polypropylene glycol or polypropylene/ ethylene copolymer glycol having a molecular weight between 1,000 and 13,000, and preferably between 2,000 and 8,000, and an amount of unsaturation less than 0.01 meq/g, and preferably between 0.0001 and 0.009 meq/g and, optionally, mixtures of polypropylene glycol or polypropylene/ethylene copolymer glycol with at least one additional polyol. Polypropylene glycol or polypropylene/ ethylene copolymer glycol includes 1,2-polypropylene glycol, 1,3-polypropylene glycol and mixtures thereof, with 1,2-polypropylene glycol being preferred, and copolymers of propyleneoxide and ethyleneoxide in the weight ratio of 100/0 to 70/30. The copolymer may comprise ethyleneoxide blocks. Preferably, the weight ratio is 100/0–80/20 propyleneoxide/ethyleneoxide. Suitable polypropyleneglycol homo- or copolymers are commercially available under the trade names of, for example, ACCLAIM 2200, 3201, 4200, 6300, 8200, 2220,4220 (manufactured by Lyondell), Preminol X-602, X-603, PML-3005, PML-30130, PML-3012, PML-4002, PML4010, PML-5001, PML-5005, PML-7001, PML-7003, PML7005, PML-70012 (manufactured by Asahi Glass Co., Ltd.), and the like. All these compounds have an unsaturated group content of 0.01 meq/g or less. Such urethane compounds may be formed by any reaction technique suitable for such purpose.

The urethane (meth)acrylate can be prepared by reacting (A1) the polypropylene glycol or polypropylene/ethylene copolymer glycol, and optionally,
(A2) a further polyol or mixture of further polyols;
(B) a polyisocyanate, and
(C) a (meth)acrylate containing a hydroxyl group.

Given as examples of the process for manufacturing the urethane (meth)acrylate by reacting these compounds are (i) a process for reacting the glycol (or mixture of the glycol with at least one further polyol (A2)), the polyisocyanate, and the hydroxyl group-containing (meth)acrylate altogether; (ii) a process for reacting the glycol and the polyisocyanate, and reacting the resulting product with the hydroxyl group-containing (meth)acrylate; (iii) a process for reacting the polyisocyanate and the hydroxyl group-containing (meth)acrylate, and reacting the resulting product with the glycol; and (iv) a process for reacting the polyisocyanate and the hydroxyl group-containing (meth)acrylate, reacting the resulting product with the glycol, and reacting the hydroxyl group-containing (meth)acrylate once more.

Given as examples of further polyols contributing further polymeric units that may be suitable as component (A2) are polyether polyols, polyester polyols, polycarbonate polyols, polycaprolactone polyols, and other polyols. These polyols may be used either individually or in combinations of two or more. There are no specific limitations to the manner of polymerization of the structural units in these polyols. Any of random polymerization, block polymerization, or graft polymerization is acceptable.

Given as examples of the polyether polyols are polyethylene glycol, other polypropylene glycol, other polypropylene glycol- ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ionpolymerizable cyclic compounds may be either random copolymers or block copolymers.

Included in these polyether polyols are products commercially available under the trademarks, for example, PTMG1000, PTMG2000 (manufactured by Mitsubishi Chemical Corp.), PEG#1000 (manufactured by Nippon Oil and Fats Co., Ltd.), PTG650 (SN), PTG1000 (SN), PTG2000 (SN), PTG3000, PTGL1000, PTGL2000 (manufactured by Hodogaya Chemical Co., Ltd.), PEG400, PEG600, PEG1000, PEG1500, PEG2000, PEG4000, PEG6000 (manufactured by Daiichi Kogyo Seiyaku Co., Ltd.) and Pluronics (by BASF).

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebasic acid, and the like can be given.

These polyester polyol compounds are commercially available under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.).

As examples of the polycarbonate polyols, polycarbonate of polytetrahydrofuran, poly(hexanediol carbonate), poly(nonanediol carbonate), poly(3-methyl-1,5-pentamethylene carbonate), and the like can be given.

As commercially available products of these polycarbonate polyols, DN-980, DN-981 (manufactured by Nippon Polyurethane Industry Co., Ltd.), Priplast 3196, 3190, 2033 (manufactured by Unichema), PNOC-2000, PNOC1000 (manufactured by Kuraray Co., Ltd.), PLACCEL CD220, CD210, CD208, CD205 (manufactured by Daicel Chemical Industries, Ltd.), PC-THF-CD (manufactured by BASF), and the like can be given.

Polycaprolactone diols obtained by reacting e-caprolactone and a diol compound are given as examples of the polycaprolactone polyols having a melting point of 0° C. or higher. Here, given as examples of the diol compound are ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like.

Commercially available products of these polycaprolactone polyols include PLACCEL 240, 230, 230ST, 220, 220ST, 220NP1, 212, 210, 220N, 210N, L230AL, L220AL, L220PL, L220PM, L212AL (all manufactured by Daicel Chemical Industries, Ltd.), Rauccarb 107 (by Enichem), and the like.

As examples of other polyols used as the component (A), ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and the like can be given.

As these other polyols, those having a alkylene oxide structure in the molecule, in particular polyether polyols, are preferred. Specifically, polyols containing polytetramethylene glycol and copolymer glycols of butyleneoxide and ethyleneoxide are particularly preferred.

The reduced number average molecular weight derived from the hydroxyl number of these polyols is usually from 50 to 15,000, and preferably from 1,000 to 8,000.

Polypropylene glycol or copolymer glycol of propylene oxide and ethylene oxide, having a molecular weight between 1,000 and 13,000 and an amount of unsaturation less than 0.01 meq/g, and one or more of these further polyols used to form an oligomer with a copolymeric or polypolymeric backbone with copolymers of the other polyols and mixtures thereof (i.e. glycols a.1 to further polyols a.2) may be present in a ratio 1:5 and 5:1, and preferably 1:2 and 2:1.

Given as examples of the polyisocyanate used as the component (B) are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanatethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred isocyanates are tolylene di-isocyanate and most preferred isophorone di-isocyanate, and methylene-bis (4-cyclohexylisocyanate).

Examples of the hydroxyl group-containing (meth) acrylate used as the component (C), include, (meth)acrylates derived from (meth)acrylic acid and epoxy and (meth) acrylates comprising alkylene oxides, more in particular, 2-hydroxyethyl(meth)acrylate, 2-hydroxypropylacrylate and 2-hydroxy-3-oxyphenyl(meth)acrylate. Acrylate functional groups are preferred over methacrylates.

The ratio of the polypropylene glycol (A), polyisocyanate (B), and hydroxyl group-containing (meth)acrylate (C) used for preparing the urethane (meth)acrylate is determined so that 1.1 to 3 equivalents of an isocyanate group included in the polyisocyanate and 0.1 to 1.5 equivalents of a hydroxyl group included in the hydroxyl group-containing (meth) acrylate are used for one equivalent of the hydroxyl group included in the glycol.

Part of the compounds containing an ethylenically unsaturated group may be replaced by compounds having a functional group which can be added to an isocyanate group. As examples of such a compound, γ-mercaptotrimethoxysilane, γ-aminotrimethoxysilane, and the like can be given. Use of these compounds improves adhesion to substrates such as glass.

In the reaction of these three components, a urethanization catalyst such as copper naphthenate, cobalt naphthenate, zinc naphthenate, di-n-butyl tin dilaurate, triethylamine, and triethylenediamine-2-methyltriethyleneamine, is usually used in an amount from 0.01 to 1 wt % of the total amount of the reactant. The reaction is carried out at a temperature from 10 to 90° C., and preferably from 30 to 80° C.

The urethane (meth)acrylate thus prepared possesses the molecule terminal shown by the above formula (1). As examples of the organic group shown by $R^2$ in the formula (1), alkyl groups such as a methyl group and an ethyl group, alkoxy groups such as a methoxy group and an ethoxy group, and the like can be given. In particular, a hydrogen atom is preferable as $R^2$.

The number average molecular weight of the urethane (meth)acrylate used in the composition of the present invention is preferably in the range from 1200 to 20,000, and more preferably from 2,200 to 10,000. If the number average molecular weight of the urethane (meth)acrylate is less than 100, the resin composition tends to solidify; on the other hand, if the number average molecular weight is larger than 20,000, the viscosity of the composition becomes high, making handling of the composition difficult.

The urethane (meth)acrylate is used in an amount from 10 to 90 wt %, and preferably from 20 to 80 wt %, of the total amount of the resin composition. When the composition is used as a coating material for optical fibers, the range from 20 to 80 wt % is particularly preferable to ensure excellent coatability, as well as superior flexibility and long-term reliability of the cured coating.

In a further embodiment of the invention, the proportion of the polyurethane (a) thus obtained in the composition is 40–95 wt %, and preferably 45–85 wt %, in the total amount of the components (a), reactive diluent (b), and amine compound (c).

Polymerizable vinyl monomers such as polymerizable monofunctional vinyl monomers containing one polymerizable vinyl group in the molecule and polymerizable polyfunctional vinyl monomers containing two or more polymerizable vinyl groups in the molecule may be added to the liquid curable resin composition of the present invention.

In a preferred embodiment of the present invention the component (b) used is a mono-functional (meth)acrylate of which the homopolymer has a glass transition temperature of 20° C. or less.

Given as specific examples of the polymerizable monofunctional vinyl monomers are vinyl monomers such as N-vinylpyrrolidone, N-vinylcaprolactam, vinylimidazole, and vinylpyridine; (meth)acrylates containing an alicyclic structure such as isobornyl (meth)acrylate, bornyl (meth)acrylate, tricyclodecanyl (meth)acrylate, dicyclopentanyl (meth)acrylate, dicyclopentenyl (meth)acrylate, and cyclohexyl (meth)acrylate; benzyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl(meth)acrylate, phenoxyethyl(meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypropylene glycol (meth)acrylate, diacetone(meth)acrylamide, isobutoxymethyl(meth)acrylamide, N,N-dimethyl(meth)acrylamide, t-octyl(meth)acrylamide, dimethylaminoethyl (meth)acrylate, diethylaminoethyl (meth)acrylate, 7-amino-3,7-dimethyloctyl (meth)acrylate, N,N-diethyl(meth)acrylamide, N,N-dimethylaminopropyl(meth)acrylamide, hydroxy butyl vinyl ether, lauryl vinyl ether, cetyl vinyl ether, 2-ethylhexyl vinyl ether, acrylate monomers shown by the following formulas (1) to (3),

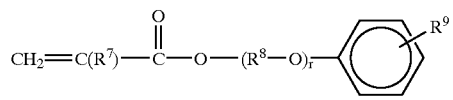
(1)

wherein $R^7$ is a hydrogen atom or a methyl group, $R^8$ is an alkylene group having 2–6, and preferably 2–4 carbon atoms, $R^9$ is a hydrogen atom or an organic group containing 1–12 carbon atoms or an aromatic ring, and r is an integer from 0 to 12, and preferably from 1 to 8,

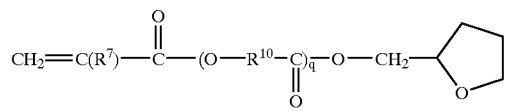
(2)

wherein $R^7$ is the same as defined above, $R^{10}$ is an alkylene group having 2–8, and preferably 2–5 carbon atoms, and q is an integer from 1 to 8, and preferably from 1 to 4,

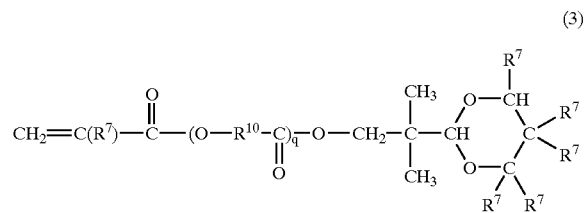
(3)

wherein $R^7$, $R^{10}$, and q are the same as defined above.

As examples of commercially available products of the polymerizable monofunctional vinyl monomers, Aronix M102, M110, M111, M113, M117 (manufactured by Toagosei Co., Ltd.), LA, IBXA, Viscoat #190, #192, #2000 (manufactured by Osaka Organic Chemical Industry Co., Ltd.), Light Acrylate EC-A, PO-A, NP-4EA, NP-8EA, M-600A, HOA-MPL (manufactured by Kyoeisha Chemical Co., Ltd.), KAYARAD TC110S, R629, R644 (manufactured by Nippon Kayaku Co., Ltd.), and the like can be given.

Of these, nonylphenol EO-modified acrylate, lauryl acrylate, and nonylphenol PO-modified acrylate are preferable. The proportion of mono-functional (meth)acrylate compounds as component (b) (being a monofunctional methacrylate of which the homopolymer has a glass transition temperature of 20° C. or less) is 3–50 wt %, and preferably 5–40 wt %, in the total amount of the components (a), (b), and (c) the amine compound.

Given as examples of the polymerizable polyfunctional vinyl monomers are the following acrylate compounds: trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl)isocyanurate di(meth)acrylate, bis(hydroxymethyl)tricyclodecane di(meth)acrylate, di(meth)acrylate of a diol which is an addion compound of ethylene oxide or propylene oxide to bisphenol A, di(meth)acrylate of a diol which is an addition compound of ethylene oxide or propylene oxide to hydrogenated bisphenol A, epoxy(meth)acrylate obtained by the addition of (meth)acrylate to diglycidyl ether of bisphenol A, diacrylate of polyoxyalkylene bisphenol A, and triethylene glycol divinyl ether.

Examples of commercially available products of the polymerizable polyfunctional vinyl monomers include Yupimer UV SA1002, SA2007 (manufactured by Mitsubishi Chemical Corp.), Viscoat #195, #230, #215, #260, #335HP, #295, #300, #700 (manufactured by Osaka Organic Chemical Industry Co., Ltd.), Light Acrylate 4EG-A, 9EG-A, NP-A, DCP-A, BP-4EA, BP-4PA, PE-3A, PE-4A, DPE-6A (manufactured by Kyoeisha Chemical Co., Ltd.), KAYARAD R-604, DPCA-20,-30,-60,-120, HX-620, D-310, D-330 (manufactured by Nippon Kayaku Co., Ltd.), Aronix M-208, M-210, M-215, M-220, M-240, M-305, M-309, M-315, M-325 (manufactured by Toagosei Co., Ltd.), and the like.

These polymerizable vinyl monomers are used in an amount from 10 to 70 wt %, and preferably from 15 to 60 wt %, of the total amount of the resin composition. If the amount is less than 10 wt %, the viscosity of the composition is so high that coatability is impaired. The amount exceeding 70 wt % may result in not only an increased cure shrinkage, but also insufficient toughness of the cured products.

The liquid curable resin composition of the present invention can be cured by heat or radiation. Here, radiation includes infrared radiation, visible rays, ultraviolet radiation, X-rays, electron beams, α-rays, β-rays, γ-rays, and the like. Visible and UV radiation are preferred.

A polymerization initiator can be added when the liquid curable resin composition of the present invention is cured. Either a heat polymerization initiator or photo-polymerization initiator can be used as the polymerization initiator. A photo-polymerization initiator is preferred.

When the liquid curable resin composition of the present invention is cured by heat, a heat polymerization initiator, usually a peroxide or an azo compound, is used. Specific examples include benzoyl peroxide, t-butyl-oxybenzoate, azobisisobutylonitrile, and the like.

When the liquid curable resin composition of the present invention is cured by radiation, a photo-polymerization initiator is used. In addition, a photosensitizer is added as required. Given as examples of the photo-polymerization initiator are 1-hydroxycyclohexylphenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide, bis-(2,4,6-trimethylbenzoyl)-phenylphosphine oxide and the like.

Examples of commercially available products of the photo-polymerization initiator include IRGACURE 184, 369, 651, 500, 907, CGI1700, 1750, 1850, 819, CG24-61, Darocur 1116, 1173 (manufactured by Ciba Specialty Chemicals Co., Ltd.), Lucirin LR8728 (manufactured by BASF), Ubecryl P36 (manufactured by UCB), and the like.

Given as examples of the photosensitizer are triethylamine, diethylamine, N-methyldiethanoleamine, ethanolamine, 4-dimethylaminobenzoic acid, methyl 4-dimethylaminobenzoate, ethyl 4-dimethylaminobenzoate, isoamyl 4-dimethylaminobenzoate, and the like. As commercially available products of the photosensitizer, for example, Ubecryl P102, 103, 104, and 105 (manufactured by UCB) are given.

When both heat and radiation are used to cure the liquid curable resin composition of the present invention, the foregoing heat polymerization initiator and photo-polymerization initiator can be used in combination. The amount of the polymerization initiator used here is in the range from 0.1 to 10 wt %, and preferably from 0.5 to 7 wt %, of the total amount of the components for the resin composition.

Beside the above-described components, other curable oligomers or polymers may be added to the liquid curable resin composition of the present invention to the extent that the characteristics of the liquid curable resin composition are not adversely affected.

Such other curable oligomers or polymers include polyester (meth)acrylate, epoxy (meth)acrylate, polyamide (meth)acrylate, siloxane polymer having a (meth) acryloyloxy group, a reactive polymer obtained by reacting (meth)acrylic acid and a copolymer of glycidyl methacrylate and other polymerizable monomers, and the like.

In a preferred embodiment, an amine compound is added to the liquid curable resin composition of the present invention to prevent generation of hydrogen gas, which causes transmission loss in the optical fibers. Preferably, the amine is a mono- or dialkyl or mono- or dialkanolamine having 2–10 carbon atoms in each alkyl chain. As examples of the amine which can be used here, ethanolamine, isopropylamine, isobutylamine, dibutylamine, diethanol amine, diisopropylamine, diethylamine, diethylhexylamine, pentylamine, hexylamine, nonylamine, aniline, methylaniline, dihexylamine, and the like can be given.

Of these compounds, ethanolamine, isopropylamine, isobutylamine, diethylamine, butylamine, and diethanolamine are particularly preferable. The component (c) may be used either individually or in combinations of two or more.

The amount of this amine compound preferably is such, that the amount of hydrogen gas generated when the cured product is allowed to stand at 100° C. for two days is 2.0 $H_2$/g or less.

From the viewpoint of ensuring excellent cure speed of the composition and superior durability of the cured products, the amount of the primary or secondary amines used in the composition as is 0.01–5 wt %, preferably 0.05–3 wt %, and particularly preferably 0.05–1 wt %, for 100 wt % of the total of the components (a), (b), and (c).

In addition to the above-described components, various additives such as antioxidants, UV absorbers, light stabilizers, silane coupling agents, coating surface improvers, heat polymerization inhibitors, leveling agents, surfactants, colorants, preservatives, plasticizers, lubricants, solvents, fillers, aging preventives, and wettability improvers can be used in the liquid curable resin composition of the present invention, as required. Examples of antioxidants include Irganox1010, 1035, 1076, 1222 (manufactured by Ciba Specialty Chemicals Co., Ltd.), Antigene P, 3C, FR, Sumilizer GA-80 (manufactured by Sumitomo Chemical Industries Co., Ltd.), and the like; examples of UV absorbers include Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Sypro Chemical Co., Ltd.), and the like; examples of light stabilizers include Tinuvin 292, 144, 622LD (manufactured by Ciba Specialty Chemicals Co., Ltd.), Sanol LS770 (manufactured by Sankyo Co., Ltd.), Sumisorb TM-061 (manufactured by Sumitomo Chemical Industries Co., Ltd.), and the like; examples of silane coupling agents include aminopropyltriethoxysilane, mercaptopropyltrimethoxysilane, and methacryloxypropyltrimethoxysilane, and commercially available products such as SH6062, SH6030 (manufactured by Toray-Dow Corning Silicone Co., Ltd.), and KBE903, KBE603, KBE403 (manufactured by Shin-Etsu Chemical Co., Ltd.); examples of coating surface improvers include silicone additives such as dimethylsiloxane polyether and commercially available products such as DC-57, DC-190 (manufactured by Dow-Corning), SH-28PA, SH-29PA, SH-30PA, SH-190 (manufactured by Toray-Dow Corning Silicone Co., Ltd.), KF351, KF352, KF353, KF354 (manufactured by Shin-Etsu Chemical Co., Ltd.), and L-700, L-7002, L-7500, FK-02490 (manufactured by Nippon Unicar Co., Ltd.).

The viscosity of the liquid curable resin composition of the present invention is usually in the range from 200 to 20,000 cP, and preferably from 2,000 to 15,000.

The radiation-curable compositions of the present invention may be formulated such that the composition after cure has a modulus as low as 0.1 MPa and as high as 2,000 MPa or more. Those having a modulus in the lower range, for instance, from 0.1 to 10 MPa, preferably 0.1 to 5 MPa, and more preferably 0.5 to less than 3 MPa are typically suitable for inner primary coatings for fiber optics. In contrast, suitable compositions for outer primary coatings, inks and matrix materials generally have a modulus of above 50 MPa, with outer primary coatings tending to have a modulus more particularly above 100 up to 1,000 MPa and matrix materials tending to be more particularly between about 50 MPa to about 200 MPa for soft matrix materials, and between 200 to about 1500 MPa for hard matrix materials. The radiation-curable composition of the present invention may be formulated such that the composition after cure has a Tg between −70° C. and 30° C. The Tg is measured as the peak tan-delta in a DMA curve at 2.5% elongation.

Elongation and tensile strength of these materials can also be optimized depending on the design criteria for a particular use. For cured coatings formed from radiation-curable compositions formulated for use as inner primary coatings on optical fibers, the elongation-at-break is typically greater than 80%, more preferably the elongation-at-break is at least 110%, more preferably at least 150% but not typically higher than 400%. For coatings formulated for outer primary coatings, inks and matrix materials the elongation-at-break is typically between 10% and 100%, and preferably higher than 30%.

The glass transition temperature (Tg), measured as the peak tan-delta determined by dynamic mechanical analysis (DMA), can be optimized depending on the particulars of the application. The glass transition temperature may be from 10° C. down to −70° C. or lower, more preferably lower than 0° C. for compositions formulated for use as inner primary coatings and 10° C. to 120° C. or higher, more preferably above 30° C., for compositions designed for use as outer primary coatings, inks and matrix materials.

The compositions of the present invention will preferably have a cure speed of 1.0 J/cm² (at 95% of maximum attainable modulus). For an outer primary coating, ink or matrix material, cure speed is preferably about 0.5 J/cm² or less (at 95% of maximum attainable modulus), and more preferably, about 0.3 J/cm² or less, and even more preferably about 0.2 J/cm² or less.

The cured products obtained by the polymerization of the resin composition of the present invention are particularly suitable for use as a coating material for optical fibers, optical fiber ribbons, and the like including primary coatings, secondary coatings, colored secondary coatings, inks, matrix materials and bundling materials.

EXAMPLES

The present invention will be explained in more detail by way of examples, which are not intended to be limiting of the present invention.

Example 1, Comparative Examples A–B

The components shown in Table 1 were combined, in the amounts noted (parts by weight), to form different curable compositions. The tests results for these compositions are also set forth in Table 1.

TABLE 1

| | Ex. 1 | Comp. Ex. A | Comp. Ex. B |
|---|---|---|---|
| Urethane (meth)acrylate oligomer: (1) | | | |
| H-(I-polypropylene glycol$^A$)$_2$-I-H | 70.0 | | |
| H-(I-polypropylene glycol$^B$)$_2$-I-H | | 70.0 | |
| H-(I-polypropylene glycol$^C$)$_2$-I-H | | | 70.0 |
| Monomers: | | | |
| Aronix M-113 (ethoxylated nonylphenol acrylate) | 5.5 | 5.5 | 5.5 |
| Isobornyl acrylate | 20.5 | 20.5 | 20.5 |
| N-vinylcaprolactam | 7.0 | 7.0 | 7.0 |
| 1,6-Hexane diol diacrylate (HDDA) | 2.0 | 2.0 | 2.0 |
| Photo-polymerization initiator: | | | |
| Lucirin TPO[1] | 1.2 | 1.2 | 1.2 |
| Additives: | | | |
| Irganox 1035[2] | 0.8 | 0.8 | 0.8 |
| Sumisorb 110[3] | 0.15 | 0.15 | 0.15 |
| SH-6062[4] | 1.0 | 1.0 | 1.0 |
| Properties | | | |
| Viscosity (cP @ 25° C.) | 3,700 | 3,400 | 2,800 |
| Young's modulus (Kg/mm²) | | | |
| (a) @ 500 mJ/cm² | 0.12 | 0.17 | 0.14 |
| (b) @ 10 mJ/cm² | 0.05 | 0.06 | 0.04 |
| Cure Speed (ratio (b)/(a)) | 0.42 | 0.35 | 0.29 |

[1](2,4,6-Trimethylbenzoyl Diphenyl Phosphine Oxide)
[2](Thiodiethylene bis[3-(3,5-di-tert-butyl-4-hydroxyphenyl)propionate]) Hydrocinnamate)
[3](2-Hydroxy-4-methoxy benzophenone)
[4](γ-mercaptopropyltrimethoxy silane)

Table Notes: (1) Urethane Oligomer=>represented by the structure

H—(I-propylene glycol)2-I—H, wherein:
  H represents a derivative of Hydroxyethylacrylate,
  I represents a derivative of Isophoronediisocyanate and Polypropylene glycol represents a derivative of one of the following polypropylene glycol:
$^A$ACCLAIM 4200 unsaturation of 0.003 meq/g; MW=4,000
$^B$ XS-3020C unsaturation of 0.03 meq/g, MW=3,000
$^C$ EXCENOL 3020 unsaturation of 0.09 meq/g MW=3,000

1. Measurement of Viscosity
   The viscosity at 25° C. was measured using a BH8 rotator.
2. Evaluation of Mechanical Characteristics of Xured Products for Young's Modulus and Cure Speed (Measurement of Modulus of Elasticity)

The liquid curable resin composition was applied on a glass plate using an applicator bar to produce a coating with a thickness of 5–60 μm. The coating was irradiated with ultraviolet radiation under a nitrogen atmosphere at a dose of (a) 500 mJ/cm² and (b) 10 mJ/cm². The cured film was peeled off from the glass plate and aged under the conditions of a 23° C. room temperature and a 50% relative humidity for 12 hours, thereby obtaining test specimens.

The Young's modulus of the test specimens at 23° C. was measured according to JIS K7113 at a tensile rate of 1 mm/min. The Young's modulus was calculated from the tensile stress at 2.5% distortion. The ratio ((a)/(b)) of Young's modulus of elasticity of the film cured by (a) 500 mJ/cm² UV irradiation and that of the film cured by (b) 10 mJ/cm² UV irradiation was calculated. This ratio was taken as the cure speed with higher ratios representing better curing characteristics (i.e., faster curing).

Examples 2 and 3

Components shown in Table 2 were mixed in the amounts noted (wt %).

Oligomer I is the reaction product of 5.87 wt % TDI, 2.6 wt % of 2-hydroxyethylacrylate (HEA) and 91.39 wt %. Acclaim 4200 (Mw: 4000; unsaturation of 0.003 meq/g), catalyst and stabilizer.

Oligomer II is the reaction product of 9.7 wt % IPDI, 3.37 wt % HEA, 57.15 wt % Acclaim 4200N and 29.62 wt % Priplast 3190. Priplast 3190 is a polyester polyol with dimer acid from Unichema.

Results are given in Table 3.

TABLE 2

|  | Example 2 | Example 3 |
| --- | --- | --- |
| Oligomer I | 68.59 | — |
| Oligomer II | — | 77.10 |
| ENPA | 7.00 | — |
| IDA | — | 8.50 |
| TriDa | 7.00 | — |
| Ebecryl III | 5.00 | — |
| VC | 4.00 | 5.00 |
| SR9003 | 4.00 | 5.00 |
| Lucerine TPO | 1.3 | 1.3 |
| Irgacure 184 | 1.8 | 1.8 |
| Irganox 1035 | 0.3 | 0.3 |
| Silane | 1.0 | 1.0 |

ENPA: ethoxylated nonylphenol acrylate
IDA: isodecyl acrylate
TriDa: tridecyl acrylate
Ebecryl III: ethoxylated aliphatic acrylate from UCB
VC: N-vinylcaprolactam
SR 9003: propoxylated neopentyl glycol diacrylate
Silane: γ-mercaptopropyl trimethoxysilane

TABLE 3

|  | Example 2 | Example 3 |
| --- | --- | --- |
| viscosity (mPa.s) | 5656 | 8840 |
| cure speed[1] (J/cm$^2$) | 0.2 | 0.3 |
| Tensile strength[2] (MPa) | 0.7 | 1.7 |
| Elongation (%) | 229 | 200 |
| Modulus (MPa) | 0.7 | 1.10 |
| Tg (peak tan δ) | −51° C. | −30° C. |
| E' (MPa) | 1.3 | 1.4 |
| peak water absorption | 1.8 | 1.8 |
| water extraction | 0.4 | 0.4 |

[1]cure speed: UV radiation at which 95% of the attainable modulus is reached
[2]mechanical properties as in standard DSM Desotech B.V. testing methods

Examples 4 and 5

A reaction vessel equipped with a stirrer was charged with 53.34 g of 2,4-tolylene diisocyanate, 150 g of nonylphenol EO-modified (4 mols) acrylate (monofunctional acrylate "Aronix M-113" manufactured by Toagosei Co., Ltd.), 0.1 g of 2,6-di-t-butyl-p-cresol, and 0.4 g of dibutyltin dilaurate. The mixture was cooled with ice to a temperature of 10° C. or less while stirring. Then, 24.4 g of 2-hydroxyethyl acrylate was added while controlling the temperature at 20–30° C. After reacting for a further one hour at 35° C., 420.61 g of a ring-opening copolymer of propylene oxide having a number average molecular weight of 2,000 ("ACCLAIM 2200" manufactured by Lyondell., unsaturated group content<0.01 meq/g) was added and the mixture was stirred at 50–60° C. for 5 hours. The reaction was terminated when the amount of the residual isocyanate was 0.1 wt % or less. 58.3 g of M-113, 139.9 g of isobornyl acrylate (manufactured by Osaka Organic Chemical Industry Co., Ltd.), 71.4 g of lauryl acrylate (manufactured by Osaka Organic Chemical Industry Co., Ltd.), 61.3 g of N-vinylcaprolactam (manufactured by ISP), 13.5 g of Lucirine TPO (manufactured by BASF), 3 g of Irganox 1035 (manufactured by Ciba Specialty Chemicals Co., Ltd.), and 10 g of γ-mercaptopropyltrimethoxysilane ("SH6062" manufactured by Toray Dow Corning Silicone Co., Ltd.) were added to the resulting mixture of urethane acrylate. The mixture was stirred at 50° C. for 3 hours to obtain a homogeneous liquid composition. This product is designated as "Example 4". A homogeneous liquid composition was obtained by adding 1 g of isobutylamine to the Liquid composition of example 4 and stirring the mixture for one hour at 50° C. This product is designated as "Example 5".

Examples 6 and 7

A reaction vessel equipped with a stirrer was charged with 53.5 g of 2,4-tolylene diisocyanate, 150 g of nonylphenol EO-modified (4 mols) acrylate (monofunctional acrylate "Aronix M-113" manufactured by Toagosei Co., Ltd.), 0.1 g of 2,6-di-t-butyl-p-cresol, and 0.4 g of dibutyltin dilaurate. The mixture was cooled with ice to a temperature of 10° C. or less while stirring. Then, 24.0 g of 2-hydroxyethyl acrylate was added while controlling the temperature at 20–30° C. After reacting for a further one hour at 35° C., 203.9 g of a ring-opening copolymer of propylene oxide and ethylene oxide having a number average molecular weight of 2,000 ("ACCLAIM 2220" manufactured by Lyondell., copolymerization ratio, 90:10, unsaturated group content<0.01 meq/g) and 317.0 g of polypropylene glycol with a the number average molecular weight 3,000 ("EXENOL3000" made by Asahi Glass Co., Ltd.) were added and the mixture was stirred at 50–60° C. for 5 hours. The reaction was terminated when the amount of the residual isocyanate was 0.1 wt % or less. 70.5 g of M-113, 100.0 g of lauryl acrylate (manufactured by Osaka Organic Chemical Industry Co., Ltd.), 60.0 g of N-vinylcaprolactam (manufactured by ISP), 15.0 g of Lucirine TPO (manufactured by BASF), 3 g of Irganox 1035 (manufactured by Ciba Specialty Chemicals Co., Ltd.) were added to the resulting mixture of urethane acrylate. The mixture was stirred at 50° C. for 3 hours to obtain a homogeneous liquid composition. This product is designated as "Example 6". 1.5 g of diethylamine was added to the Liquid composition of Example 6 and stirred for one hour at 50° C. to obtain a homogeneous liquid composition. This product is designated as "Example 7".

Examples 8 and 9

A reaction vessel equipped with a stirrer was charged with 63.1 g of 2,4-tolylene diisocyanate, 0.2 g of 2,6-di-t-butyl-p-cresol, and 500.5 g of a ring-opening copolymer of ethylene oxide and propylene oxide ("ACCLAIM 2220", copolymerization ratio, 90:10, unsaturated group content<0.01 meq/g). The mixture was cooled with ice to a temperature of 10° C. or less while stirring. Then, 0.4 g of dibutyltin dilaurate was added to initiate the reaction. The liquid temperature increased to 35° C. After the reaction for two hours at 40° C., 5.0 g of γ-mercaptopropyltrimethoxysilane ("SH6062" manufactured by Toray DowCorning Co.) was added and the mixture was reacted for a further one hour. Next, 30.7 g of 2-hydroxyethyl acrylate was added and the mixture was stirred for 5 hours while maintaining the temperature at 50–60° C. The reaction was terminated when the amount of the residual isocyanate was 0.1 wt % or less. 186.7 g of M-113, 102.1 g of phenol EO-modified (4 mols) acrylate ("Aronix M-102" manufactured by Toagosei Co., Ltd.), 55.2 g of N-vinylcaprolactam (manufactured by BASF), 13.5 g of Lucirine TPO (manufactured by BASF), and 10 g of Irganox 1035 (manufactured by Ciba Specialty Chemicals Co., Ltd.) were added to the resulting mixture of urethane acrylate. The mixture was stirred at 50° C. for 3 hours to obtain a homogeneous liquid composition. This product is designated as "Example 8". 1.0 g of diethylamine was added to the Liquid composition of example 8 and stirred for one hour at 50° C. to obtain a homogeneous liquid composition. This product is designated as "Example 9".

Example 10–11

A reaction vessel equipped with a stirrer was charged with 77.9 g of isophorone diisocyanate, 0.2 g of 2,6-di-t-butyl-p-cresol, and 537.7 g of a ring-opening copolymer of ethylene oxide and propylene oxide ("ACCLAIM 2220", copolymerization ratio, 90:10, unsaturated group content<0.01 meq/g). The mixture was cooled with ice to a temperature of 10° C. or less while stirring. Then, 0.5 g of dibutyltin dilaurate was added to initiate the reaction. The liquid temperature increased to 35° C. After the reaction for 3 hours at 40° C., 27.1 g of 2-hydroxyethyl acrylate was added and the mixture was stirred for 5 hours while maintaining the temperature at 50–60° C. The reaction was terminated when the amount of the residual isocyanate was 0.1 wt % or less. 128.5 g of M-113, 128.5 g of isobornyl acrylate (manufactured by Osaka Organic Chemical Industry Co., Ltd.), 69.2 g of N-vinylcaprolactam (manufactured by BASF), 12.0 g of Lucirine TPO (manufactured by BASF), 3 g of Irganox 1035 (manufactured by Ciba Specialty Chemicals Co., Ltd.), and 9.9 g of γ-mercaptopropyltrimethoxysilane ("SH6062" manufactured by Toray Dow Corning Silicone Co., Ltd.) were added to the resulting mixture of urethane acrylate. The mixture was stirred at 50° C. for 3 hours to obtain a homogeneous liquid composition. This product is designated as "Example 10". 1.0 g of diethylamine was added to the Liquid composition of example 10 and stirred for one hour at 50° C. to obtain a homogeneous liquid composition. This product is designated as "Example 11".

Example 12 and Comparative Example C

A reaction vessel equipped with a stirrer was charged with 67.6 g of isophorone diisocyanate, 0.2 g of 2,6-di-t-butyl-p-cresol, and 608.9 g of polyoxypropylene glycol (molecular weight=3,000, unsaturated group content=0.12 meq/g). The mixture was cooled with ice to a temperature of 10° C. or less while stirring. Then, 0.5 g of dibutyltin dilaurate was added to initiate the reaction. The liquid temperature increased to 35° C. After the reaction for 3 hours at 40° C., 23.5 g of 2-hydroxyethyl acrylate was added and the mixture was stirred for 5 hours while maintaining the temperature at 50–60° C. The reaction was terminated when the amount of the residual isocyanate was 0.1 wt % or less. 55.0 g of M-113, 150.0 g of isobornyl acrylate (manufactured by Osaka Organic Chemical Industry Co., Ltd.), 70.0 g of N-vinylcaprolactam (manufactured by BASF), 10.0 g of 1,6-hexamethylene glycol diacrylate ("Light Acrylate 1.6HX-A" manufactured by Kyoeisha Chemical Co., Ltd. ), 12.0 g of Lucirine TPO (manufactured by BASF), 3 g of Irganox 1035 (manufactured by Ciba Specialty Chemicals Co., Ltd.), and 10.0 g of γ-mercaptopropyltrimethoxysilane ("SH6062" manufactured by Toray Dow Corning Silicone Co., Ltd.) were added to the resulting mixture of urethane acrylate. The mixture was stirred at 50° C. for 3 hours to obtain a homogeneous liquid composition. This product is designated as "Comparative example C". 1.0 g of diethylamine was added to the Liquid composition of comparative example C and stirred for one hour at 50° C. to obtain a homogeneous liquid composition. This product is designated as "Example 12".

Tests Performed

The liquid curable resin compositions obtained in the above Examples 4–12 and Comparative Example C were cured to prepare test specimens, which were submitted to the following evaluations. Results are shown in Table 4.

1. Measurement of Viscosity

The viscosity at 25° C. was measured using a BH8 rotator.

2. Preparation of Test Specimens

The liquid curable resin compositions were applied on glass sheets using an applicator bar for the preparation of films with a 250 μm thickness. The coatings were cured by irradiation of ultraviolet light at a dose of 1 J/cm$^2$ in the air. The coatings were allowed to stand for 12 hours or more at a temperature of 23° C. and a relative humidity of 50%, and subjected to the following tests.

3. Young's Modulus of Elasticity

The cured films were cut into strips with a width of 6 mm and subjected to measurement of modulus of elasticity. The drawing rate was 1 mm/min and the bench mark distance was 25 mm. The Young's modulus of elasticity was calculated by dividing the weight at 2.5% elongation by the cross section and 0.025.

4. Cure Speed

For the cure speed test, cured films with a thickness of about 60 μm were prepared by irradiating coatings with UV light at a dose of 10 mJ/cm$^2$ or 500 mJ/cm$^2$. The cure speed was determined as a ratio of the Young's modulus of the film cured at 500 mJ/cm$^2$ to the Young's modulus of the film cured at 10 mJ/cm$^2$.

5. Hydrogen Gas Generation

The amount of hydrogen gas generated was measured using films with a thickness of 200 μm prepared by irradiation of UV light in paragraph 2 above. About 1 g of the film was placed in a sealed glass tube and heated at 100° C. for 2 days. The amount of hydrogen gas generated in the sealed glass tube was quantitatively measured using gas chromatograph.

Table 4 shows, that the use of a polypropylene glycol with a high amount of unsaturation results in a coating composition with a relatively low cure speed. The cure speed and the release of hydrogen gas on aging can be surprisingly improved by using a primary or secondary amine (Example 12). It is however preferred to use a polyproylene glycol with a low amount of unsaturation to improve the cure speed (see e.g. Examples 4, 6, 8, and 10, which show better cure speed than Example 12). The combined use of a polypropylene glycol with low unsaturation and a primary or secondary amine improves the cure speed and hydrogen gas generation even further.

TABLE 4

|  | Composition No. | | | | | | | | | |
| --- | --- | --- | --- | --- | --- | --- | --- | --- | --- | --- |
|  | Example | | | | | | | | | Comp. |
|  | 4 | 5 | 6 | 7 | 8 | 9 | 10 | 11 | 12 | Ex C |
| Component | | | | | | | | | | |
| Component (a) (wt %) | 50 | 50 | 50 | 50 | 62 | 62 | 65 | 65 | 69.3 | 69.3 |
| Component (b) (wt %) | 28 | 28 | 32 | 32 | 30 | 30 | 13 | 13 | 5.4 | 5.4 |
| Component (c) (wt %) | — | 0.1 | — | 0.15 | — | 0.1 | — | 0.1 | 0.1 | — |
| Characteristics | | | | | | | | | | |
| Viscosity (cP) | 5000 | 5600 | 4500 | 4900 | 2500 | 2900 | 3100 | 3700 | 3200 | 3300 |
| Young's modulus (kg/mm$^2$) | 0.10 | 0.12 | 0.08 | 0.10 | 0.15 | 0.17 | 0.10 | 0.12 | 0.09 | 0.08 |
| Cure speed* | 0.60 | 0.79 | 0.58 | 0.80 | 0.80 | 0.91 | 0.76 | 0.89 | 0.48 | 0.19 |
| Hydrogen gas ($\mu$l/g) | 3.0 | 1.5 | 4.1 | 1.3 | 3.8 | 0.9 | 3.9 | 1.1 | 1.8 | 3.3 |

*Ratio of the Young's modulus at 10 mJ/cm$^2$ to the Young's modulus at 500 mJ/cm$^2$

What is claimed is:

1. A curable resin composition for optical fibers comprising
   (a) 40–95 wt % of polyurethane prepared by reacting
      (1) a polypropylene glycol having
         (i) a molecular weight between 2,000 and 8,000; and
         (ii) an amount of unsaturation of less than 0.01 meq/g;
      (2) a polyester polyol;
      (3) polyisocyanate; and
      (4) (meth)acrylate containing a hydroxyl group;
   (b) 3–50 wt % of mono-functional (meth)acrylate of which the homopolymer has a glass transition temperature of 20° C. or less, and
   (c) 0.01–5 wt % of primary or secondary amine compound,
   wherein wt % is based on the total amount of the components (a), (b), and (c).

2. A radiation curable resin composition comprising:
   (1) a urethane (meth)acrylate prepared by reacting
      (a) a polypropylene glycol having
         (i) a molecular weight between 2,000 and 8,000; and
         (ii) an amount of unsaturation of less than 0.01 meq/g;
      (b) polyisocyanate; and
      (c) (meth)acrylate containing a hydroxyl group;
   (2) at least one component selected from the group consisting of nonylphenol EO-modified acrylate, lauryl acrylate, and nonylphenol PO-modified acrylate; and
   (3) a poly(meth)acrylate monomer.

3. The composition of claim 2, wherein said polyisocyanate includes tolylene di-isocyanate.

4. The composition of claim 2, wherein said composition comprises a silane coupling agent.

5. The composition of claim 2, wherein said composition comprises a component selected from the group consisting N-vinylpyrrolidone, N-vinylcaprolactam, vinyl imidazole, and vinylpyridin.

6. The composition of claim 2, wherein said composition comprises propoxylated neopentyl glycol diacrylate.

7. The composition of claim 2, wherein said composition comprises a photo-polymerization initiator.

8. The composition of claim 3, wherein said composition comprises antioxidant.

9. A substrate comprising a cured coating obtained by radiation curing the composition of claim 2.

10. The substrate according to claim 9, wherein the substrate is
    (i) a bare optical fiber,
    (ii) an optical glass fiber coated with a secondary coating,
    (iii) at least two coated optical glass fibers, or
    (iv) at least two ribbons comprising at least two coated optical glass fibers.

11. An optical fiber, ribbon, or cable comprising at least one coating obtained by curing the composition of claim 2.

12. A radiation curable resin composition comprising:
    (1) a urethane (meth)acrylate prepared by reacting
       (a) a polypropylene glycol having
          (i) a molecular weight between 2,000 and 8,000; and
          (ii) an amount of unsaturation of less than 0.01 meq/g;
       (b) a polyester polyol;
       (c) polyisocyanate; and
       (d) (meth)acrylate containing a hydroxyl group; and
    (2) reactive diluent.

13. The composition of claim 12, wherein said polyester polyol is obtained by reacting polyhydric alcohol with polybasic acid.

14. The composition of claim 13, wherein said polybasic acid includes dimer acid.

15. The composition of claim 12, wherein said polyisocyanate includes isophorone diisocyanate.

16. The composition of claim 12, wherein said polyisocyanate includes tolylene di-isocyanate.

17. The composition of claim 12, wherein said composition comprises a silane coupling agent.

18. The composition of claim 12, wherein said composition comprises a component selected from the group consisting N-vinylpyrrolidone, N-vinylcaprolactam, vinyl imidazole, and vinylpyridin.

19. The composition of claim 12, wherein said composition comprises a poly(meth)acrylate monomer.

20. The composition of claim 12, wherein said composition comprises propoxylated neopentyl glycol diacrylate.

21. The composition of claim 12, wherein said composition comprises a photo-polymerization initiator.

22. The composition of claim 16, wherein said composition comprises antioxidant.

23. A substrate comprising a cured coating obtained by radiation curing the composition of claim 12.

24. The substrate according to claim 23, wherein the substrate is (i) a bare optical fiber, (ii) an optical glass fiber coated with a secondary coating, (iii) at least two coated optical glass fibers, or (iv) at least two ribbons comprising at least two coated optical glass fibers.

25. An optical fiber, ribbon, or cable comprising at least one coating obtained by curing the composition of claim 12.

* * * * *